Nov. 8, 1966

F. L. CALHOUN 3,283,898

INSPECTION APPARATUS

Original Filed April 8, 1960

INVENTOR:
Fredrick L. Calhoun

By Smyth, Roston & Pavitt

Attorneys

INVENTOR:
Fredrick L. Calhoun

Nov. 8, 1966  F. L. CALHOUN  3,283,898
INSPECTION APPARATUS
Original Filed April 8, 1960  3 Sheets-Sheet 3

INVENTOR:
Fredrick L. Calhoun
Attorneys.

3,283,898
Patented Nov. 8, 1966

3,283,898
INSPECTION APPARATUS

Fredrick L. Calhoun, Torrance, Calif., assignor to Geo. J. Meyer Manufacturing Co., Cudahy, Wis., a corporation of Wisconsin
Continuation of application Ser. No. 20,884, Apr. 8, 1960. This application July 16, 1965, Ser. No. 475,316
36 Claims. (Cl. 209—111.7)

This is a continuation of my copending application, Serial No. 20,884, filed April 8, 1960, now abandoned entitled "Inspection Apparatus."

This invention relates to inspection apparatus and, more particularly, to apparatus for inspecting bottles for cleanliness.

When bottles or other transparent devices are photoelectrically scanned, small particles of foreign matter are generally difficult to detect. In a copending patent application Serial No. 741,634 (now abandoned), filed on June 12, 1958, by Fredrick H. Calhoun, Donald D. Williams and James H. Wyman and refiled as continuation application Serial Number 60,753 on October 5, 1960, now Patent No. 3,133,640 and assigned of record to the assignee of record of this application, a rotating reticle, or light chopper, is provided as part of the photoelectric scanning means to facilitate the detection of small foreign particles. The reticle intercepts the light from the illuminated bottle to a photocell which also forms part of the photoelectric scanning means. The reticle is made up of alternate opaque and transparent areas which are successively interposed between any foreign particles in the bottle and the photocell. The electrical output of the photocell, accordingly, is an alternating signal having a frequency related to the rotating speed of the reticle and the number of alternate opaque and transparent areas of the reticle. If foreign particles are not present in the bottle, the output of the photocell is substantially direct current.

The inspection system disclosed in the application by Calhoun, Williams and Wyman, though generally satisfactory, has a number of limitations with respect to the sensitivity of the photoelectric scanning means. First, the sensitivity varies across the scanning field, being lowest at the center of the rotating reticle, and second the overall sensitivity of the scanning means is low because the particle blocks only a small part of the light from the bottle through the reticle. One-half of the available light is transmitted through the reticle because a number of transparent sectors are required to a signal suitable for processing.

In the copending patent application Serial No. 808,172 filed by Fredrick·L. Calhoun and Abner L. Browning on April 22, 1959, now Patent No. 3,081,666 and assigned of record to the assignee of record of this application, the variations of scanning sensitivity across the field are reduced utilizing a lens system for successively coupling different areas of the total field to the reticle. Low sensitivity regions are avoided, but the overall sensitivity is low because of the 50 percent transmission by the reticle.

In an illustrative embodiment of this invention, low sensitivity regions are avoided and the overall sensitivity is improved without utilizing a reticle. The light from different areas of the scanning field is sequentially provided by a rotating prism to a photocell mosaic including at least two photocells. The sensitive areas of the photocells together form an area at least as large as the cross-sectional area of the beam from the prism. All the light through the prism, accordingly, impinges upon the photocells of the mosaic.

Features of this invention relate to the utilization of the photocells forming the mosaic in a control circuit so that the signal changes of the photocells complement each other. The output of the control circuit is provided to an alternating current amplifier which is tuned to a frequency related to the speed of the prism. As the prism rotates, the output of the A.C. amplifier is a series of square pulses having a repetition rate related to the rotating speed of the prism and having a duty cycle indicative of the radial position of the particle of dirt in the scanning field. Features of this invention pertain to the provision of means for readily determing the position of the particle in the scanned field. If no particles are present, the output is a D.C. signal because the light impinging upon the two photocells is equal through the rotation of the prism.

In an embodiment of this invention, a mosaic of eight photocells is provided, each of which forms part of a separate circuit arrangement. The circuit arrangements are successively sampled by a high speed commutator and the sampled signals are coupled through amplifying means to control the reject apparatus. The response of the individual photocells is in this manner separately sampled to increase the sensitivity of response due to the utilization of smaller photocell areas.

Further features and advantages of this invention will become apparent upon consideration of the following description when read in conjunction with the drawing wherein.

Figure 5:
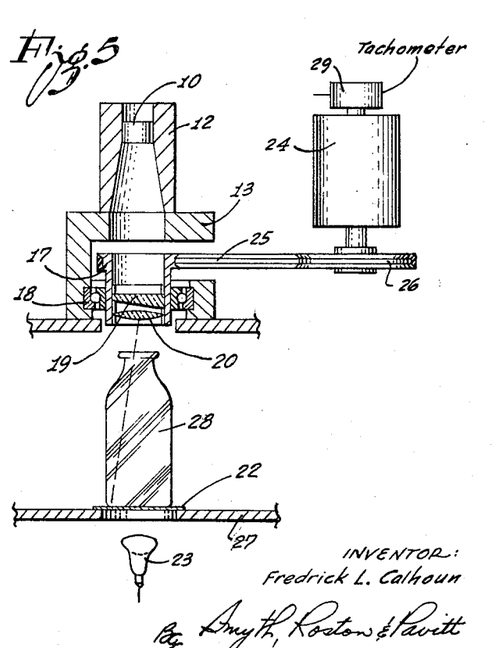
FIGURE 5 is a sectional view through the optical portion of the inspection apparatus of this invention.

Referring first to FIGURE 5, a bottle 28 is moved on a conveyer 27 through an inspection zone defined by a source of illumination 23. Energy such as the light from the source 23 is coupled through a diffusing plate 22 which supports the bottle 28 on the conveyer 27. The plate 22, which may illustratively be made of opal glass, diffuses the light evenly over the bottom of the bottle 28. The bottle 28, which is transparent, is one of a large number of bottles which may be moved at a rapid and continuous speed througs the inspection zone. The inspection rate, illustratively, may be 600 to 700 bottles per minute. Though the inspection rate is, therefore, quite high, each bottle 28 is carefully inspected for small particles of foreign matter or dirt in the bottle. The illuminated bottom of the bottle 28 forms a light field 32 depicted in FIGURES 1 and 2.

Figures 1, 2:
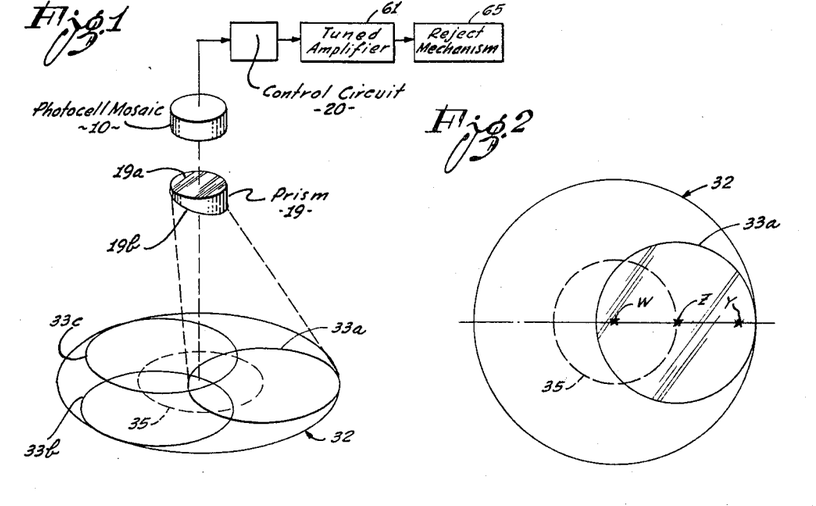
FIGURE 1 is a functional representation of the inspection apparatus of this invention illustrating the relationship between the sequentially sample areas and the total scanning field.
FIGURE 2 is a functional representation of the total scanning field and the nutation path of the sequentially scanned areas illustrating a number of particles of foreign matter to be detected.

The field 32 represents the total area scanned by a rotating prism 19 during each revolution of the prism 19. The prism 19, shown in FIGURE 5 as well as in FIGURES 1 and 2, has an upper face 19a which is perpendicular to its axis of rotation, and a lower face 19b which is at an acute angle to its axis of rotation. As the prism 19 rotates, it accordingly couples light from different successive areas of the light field 32. The areas 33a–33c scanned at different time epochs during the rotation of the prism 19, are illustrated in Figure 1. The sucessive centers of the scan areas form a nutation circle 35 shown in FIGURE 2 and in FIGURE 3.

Referring again to FIGURE 5, the rotating cylindrical prism 19 receives the light from an objective or field lens 20. The lens 20 focuses the image of the bottom of the bottle 21 on a photocell mosaic 10 which is hereinafter described in detail. The lens 20 and the prism 19 may be both mounted in a bearing pulley 17 which is rotated in bearings 18 by a belt 25. The lens 20 may also be mounted stationary with respect to the prism 19. An advantage of rotatably mounting the lens 20 with the prism 19 in the pulley 17 is that the lens 20 remains cleaner and any particle adhering to the lens 20 does not provide for an alternating signal at the photocell mosaic 10. The bearings 18 are supported in a bearing block 13 which also supports a member 12. The photocell mosaic 10, mentioned above, is supported in the stationary member 12 and is, therefore, stationary with respect to the rotating prism 19. The belt 25, which drives the pulley 17, may in turn be driven by a pulley 26 and the pulley 26 may in turn be rotated by a conventional type motor 24. Illustratively, the speed of rotation of the prism 19 may be 15,000 revolutions per minute. The high rotating speed is preferred because the bottles 28 are moved quite rapidly through the inspection zone.

Figure 3:
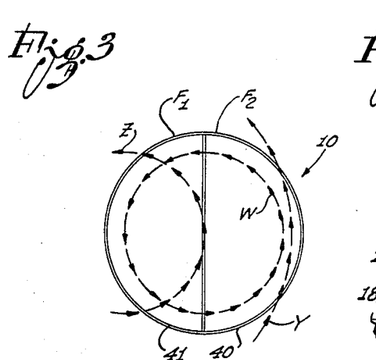
FIGURE 3 is a functional representation of the sensitive surface of one embodiment of the photocell mosaic utilized in the inspection apparatus of this invention and the relative motions of a number of particles of foreign matter in the bottle due to the rotation of a prism in the apparatus.
Figure 6:
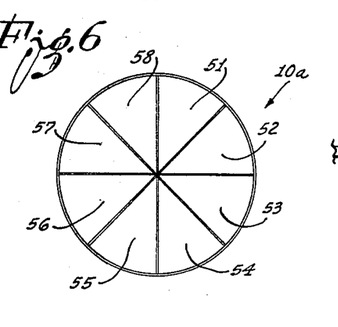
FIGURE 6 is a functional representation of another embodiment of the photocell mosaic utilized in the inspection apparatus of this invention.

The photocell mosaic 10 may include two or more photocells with FIGURE 3 illustrating one embodiment having two photocells 40 and 41 and the mosaic 10a in FIGURE 6 illustrating a second embodiment having eight photocells 51 through 58. The photocells 40 and 41 have semi-circular sensitive areas and the photocells 51 through 58 have wedge-shaped sensitive areas to form in both embodiments an effectively contiguous circular sensitive area. All the light from the rotating prism 19 impinges on the contiguous sensitive area of the mosaic. Photocells of such and other different shapes are referred to as contour photocells and are manufactured, for example, by the International Rectifier Company. The contour photocells are effectively variable resistance devices, with the resistance presented by each photocell being determined by the amount of light impinging upon its sensitive surface. The photocells constitute energy-responsive members since they receive the light passing from the source 23. These energy-responsive members are independent of one another since they are spaced from one another. When the energy is light, the photocells provide radiation-sensitive surfaces.

If the bottle is clean, the amount of light provided to the photocell mosiac 10 is constant throughout the rotation of the prism 19. At any instant, the light from the areas 33a, 33b, 33c, etc., being scanned is the same as from the other areas scanned during the rotation of the prism 19. The output of the mosaic 10 or the mosaic 10a is, therefore, a D.C. signal for a clean bottle 28, as is further hereinafter described in reference to FIGURE 4.

As indicated above, FIGURE 2 illustrates the nutation circle 35 followed by the successively scanned areas 33a, 33b, etc., with respect to the total field 32. The diameter of the area scanned at any instant is somewhat larger than the radius of the field 32 so that a particle of dirt at the center of the field 32 is continuously scanned. FIGURE 2 illustrates a particle W at the center of the field 32 and also particles Z and Y at two other positions at the bottom of the bottle. Each of the areas 33a, 33b, etc., includes the particle W but at different angular positions because at any instant the area being scanned includes the center of the field 32. FIGURE 3 illustrates the effective movement of the images of the three particles W, Z, and Y across the photocell mosaic 10 including the two photocells 41 and 42. As shown in FIGURE 3, the movement of the image of the particle W is a circle concentric with the center of the composite sensitive area of the mosaic 10.

The mosaic 10 includes at least two photocells because the effective path of the image of the particle W is concentric with the center of the sensitive area of the mosaic 10. If only a single photocell having a circular sensitive area is utilized, the image of the particle W does not provide an A.C. component at the output of the photocell. The D.C. level at the output of the photocell would be somewhat reduced by the image of the particle W, but for small particles such small difference in level would be effectively undetectable. D.C. signals are generally utilized to detect relatively large pieces of foreign matter in the bottle, but are not suitable for detecting small particles. For this reason, therefore, the mosaic 10 includes at least two photocells 40 and 41 to develop an A.C. signal which is suitable for detecting small particles.

Figure 4:
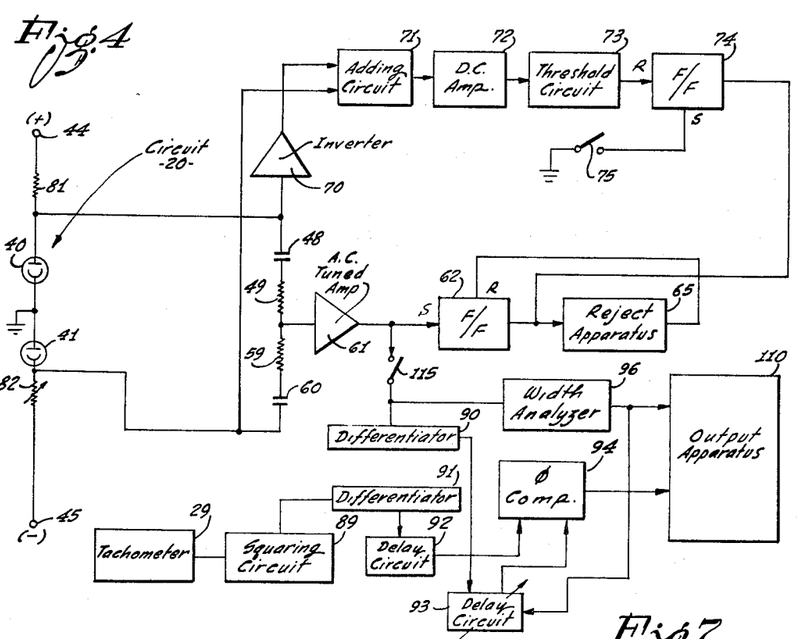
FIGURE 4 is a partially circuit and partially functional representation of one embodiment of the electrical circuitry of the inspection apparatus of this invention.

FIGURE 1 illustrates in simplified block form the electrical circuitry which is illustrated in some detail in FIGURE 4. As illustrated in FIGURE 1, the signal from the photocell mosaic 10 are introduced to control circuitry 21 which combines the signals from the photocell mosaic in a particular relationship. The signals from the control circuitry 21 then pass through a tuned amplifier 61 to a reject mechanism 65 which controls whether the bottle is accepted or rejected. The tuned amplifier 61 and the reject mechanism 65 are also shown in FIGURE 4.

FIGURE 4 illustrates the electrical circuitry including the two photocells 40 and 41. The photocell 40 is coupled through an associated resistor 81 to a positive potention source 44, and the other photocell 41 is coupled through an associated rheostate 82 to a negative potential source 45. One terminal of each of the two photocells 40 and 41 is connected to a common ground connection. In this manner, the light impinging upon the two photocells 40 and 41 provides for opposite polarity pulses. The rheostat 82 is adjustable to compensate for any mis-match between the characteristics of the two photocells 40 and 41. The respective junction between the rheostat 82 and the photocell 41 is connected to a capacitor 60 and the respective junction between the resistor 81 and the photocell 40 is connected to a capacitor 48.

The output of the photocell 41 through the capacitor 60, accordingly, is a positive pulse and the output of the photocell 40 through the capacitor 48 is a negative pulse. The positive and the negative pulses are coupled respectively through the capacitors 48 and 60 to resistors 49 and 59, the junction of which is connected to an A.C. tuned amplifier 61.

Figure 8:
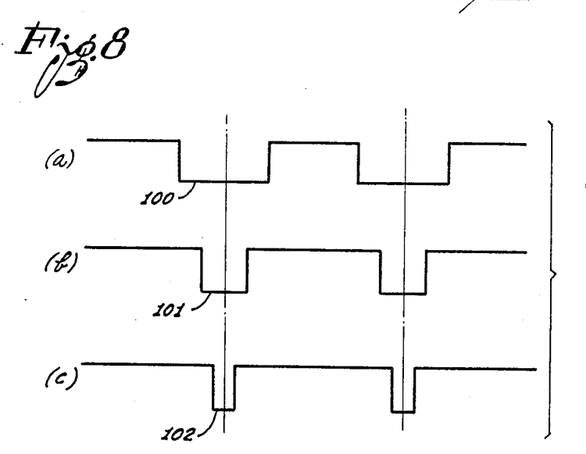
FIGURE 8 is a series of curves illustrating the electrical signals provided from a control circuit responsive to particles of foreign matter at different positions in the bottle.

As the prism 19 in FIGURES 1 and 5 rotates, the light provided to the photocells 40 and 41 is the same as long as a particle of foreign matter is not present on the bottom of the bottle or container 28. When, however, one of the particles W, Z or Y or the like is present in the field of view 32, a series of pulses is provided to the A.C. amplifier 61 having a repetition rate determined by the speed of rotation of the prism 19 and a pulse width determined by the radial distance of the particle from the center of the field 32. In FIGURE 8, the pulses 100, 101 and 102, respectively, of curves a, b and c, depict the pulses generated by the particles W, Z and Y in the field 32.

Assume first that the field 32 includes the particle W at the center of the field. At any position of the prism 19, the image of the particle W is received at one of the photocells 40 and 41. If the photocell 40 receives the particle image, the illumination thereat is less than at the other photocell 41. The resistance presented by the photocell 40 is, accordingly, greater than the resistance presented by the photocell 41. As described above, the image of the particle W follows a circular path. When the illumination impinging upon the photocell 40 decreases, the illumination impinging upon the photocell 41 increases because the image of the particle W passes from the photocell 41 to the photocell 40. Due to the fact that the photocells 40 and 41 are connected to opposite polarity sources 44 and 45, the two changes in photocell conductivity complement each other to provide a pulse having an increased magnitude to the amplifier 61. The decrease of conductivity of the photocell 40 provides a positive pulse to the amplifier 61 and the increase of conductivity of the photocell 41 also provides for a positive pulse to the amplifier 61. The positive pulses capacitively coupled to the amplifier 61 are, accordingly, additive.

When the image of the particle W moves back from the photocell 40 to the photocell 41, the potentials across the photocells 40 and 41 decrease. A squarewave is in this manner introduced to the amplifier 61 having a frequency determined by the rotating speed of the prism 19 and the number of photocells in the mosaic. The repetition rate or fundamental frequency of the signal generated by the presence of a particle at any position is the same for different photocell mosaics and equal to the rotating speed of the prism 19. Similarly, when the mosaic 10a is utilized having eight photocells 51 through 58 (FIGURE 6), the fundamental frequency is the same for any particle position.

The amplifier 61 has a bandwidth wide enough to accommodate the frequencies produced by either of the photocell mosaics 10 and 10a. If the prism 19 is rotated at a speed of 15,000 revolutions per minute, then the fundamental frequency to the amplifier 61 is 15,000 divided by 60, or 250 cycles per second. The squarewaves also include the odd harmonics of the fundamental, and when the mosaic 10a is utilized, fundamental frequencies up to 1,000 cycles per second (for the particle W) are present. For the two photocell mosaics 10, the further the particle is from the center of the field 32, the smaller the pulse width but the repetition rate is the same so the fundamental frequency remains the same. When the mosaic 10 is utilized, the bandwidth of the tuned amplifier 61 may illustratively be from one-half the fundamental frequency (250 c.p.s.) to twice the fundamental frequency. For the mosaic 10a, a somewhat larger bandwith from 125 c.p.s. to 2,000 c.p.s. is desirable.

The amplifier 61 may include compensating circuitry, not shown, to compensate for the variation in power with pulse widths. The magnitude of the pulses provided by the amplifier 61 depends essentially on two factors, first, the size of the detected particle of dirt, and second its position on the bottom of the bottle 28. The larger the particle, the greater is the change in illumination at the photocells 40 and 41, or 51 through 58 and, therefore, the larger is the magnitude of the pulse to the amplifier 61. The position of the particle also determines the magnitude of the pulse because the position determines the nutation path of the image of the particle across the photocells. When the image passes from one photocell to another, a larger pulse is provided than when the image passes from the exterior to an outside edge of a photocell.

The output of the amplifier 61 is provided to the set terminal of a flip-flop circuit 62. If the alternating current signal exceeds a predetermined value, it accordingly functions to set the flip-flop circuit 62. The predetermined value is such that irregularity in the glass of the bottle due to raised letters or the like do not set the circuit 62. When the circuit 62 is set, it operates reject apparatus 65 for rejecting the bottle being inspected. When the bottle is rejected, the apparatus 65 automatically resets the flip-flop circuit 62.

In addition to the control of the apparatus 65 by the alternating current signal, a D.C. signal may also be utilized to control the apparatus 65. The negative signal from the photocell 40 is phase inverted by an inverter 70 and introduced to an adding circuit 71. The circuit 71 adds the signal from the inverter 70 to the signal from the photocell 41 and introduced the summed signal to a D.C. amplifier 72. The D.C. signal from the amplifier 72 is indicative of the level of the total light energy received by the photocell mosaic 10. The D.C. signal is coupled from the amplifier 72 to a threshold circuit 73 which operates a flip-flop circuit 74 if the D.C. signal exceeds a predetermined value. The flip-flop circuit 74 is automatically set by a switch 75 when a bottle 28 is moved into the inspection zone. When the circuit 74 is set, a reject indication is provided but the circuit 74 is reset by the D.C. signal from the threshold circuit 73. If a D.C. signal is not provided to the circuit 74, it functions to operate the reject apparatus 65 even though an A.C. signal is not provided to the flip-flop circuit 62.

In addition to operating the reject apparatus 65, the A.C. signal from the tuned amplifier 61 also can be utilized to indicate the position of the particle of foreign matter in the bottle 28. The motor 24 in FIGURE 5, which rotates the prism 19 to successively couple the different areas to the mosaic 10, also operates a tachometer 29. The tachometer 29 provides an output signal having a frequency indicative of the motor 24 and, therefore, the speed of the prism 19. The rotating speed of the prism 19, as described above, determines the repetition rate of the pulses to the amplifier 61. The tachometer signal from the tachometer 29 is rectangularized in a squaring circuit 89 and the rectangular or square signal is differentiated in a gated differentiator 91 which provides short timing pulses to a delay circuit 92. The differentiated pulses indicate a particular starting position of the scanning cycle by the prism 19. For example, the timing pulse may be provided to the delay circuit 92 each time the area 33a of the field 32 is being inspected. The signal from the amplifier 61 is coupled through a switch 115 and a second gated differentiator 90 which provides pulses of one polarity to an adjustable delay circuit 93. The square pulses are also provided from the amplifier 61 through the switch 115 to a pulse width analyzer 96 which provides an output signal to apparatus 110 which is indicative of the pulse width and, therefore, of the radial distance of the particle position. The pulse width does not vary linearly with the radial distance but in accordance with a particular known function. The analyzer 96 also controls the delay provided by the delay circuit 93 for the pulses from the differentiator 90. The delayed pulses from the circuits 92 and 93 are introduced to a phase comparator 94 which provides an output pulse related to any timing difference therebetween.

The adjustable delay circuit 93 compensates for the difference in timing of the differentiated pulses due to the different pulse widths at different radial locations. In other words, the pulses provided by the particles Z, Y and W in FIGURE 2, should each provide for the same signal from the phase comparator 94. However, these particles provide for different pulse widths as illustrated in FIGURE 8 which also are initiated at different time positions. By adjusting the delay circuit 93, the pulses 100, 101 and 102 effectively provide for pulses initiated at the same time positions. The output apparatus 110, accordingly, receives a first signal from the pulse width analyzer 96 which indicates the radial position of a detected particle and a second signal from the phase comparator 94 which indicates the angular position of the detected particle in the field 32. The information is, accordingly, received in polar coordinate form for identifying the position of the detected particle of dirt at the bottom of the bottle 28. The apparatus 110 may include computing equipment, not shown, for analyzing and utilizing the particle position information.

When the mosaic 10a is utilized instead of the mosaic 10, the information supplied to the apparatus 110 also includes the position information. The position is indicated by the pulse width and the time position of the leading edge of the pulse. The apparatus 110 includes equipment for analyzing the information supplied thereto and for converting the information to a more usable form.

Figure 9:
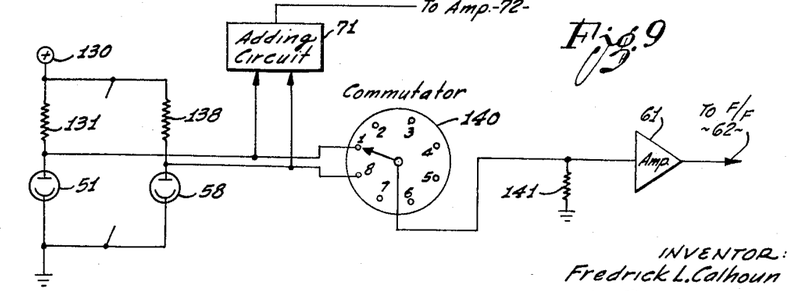
FIGURE 9 is a partially circuit and partially functional representation of the electrical circuitry of a second embodiment of the inspection apparatus of this invention.

When the mosaic 10a is utilized, the circuitry depicted in FIGURE 9 may be utilized to sequentially sample the eight photocells 51 through 58 and to introduce the sampled signals to the A.C. amplifier 61. Referring to FIGURE 9, only a portion of the circuit is depicted as the components coupled to the output of the amplifier 61 and to the output of the adding circuit 71 are the same as depicted in FIGURE 4. The eight photocells 51 through 58 are individually connected by resistors 131 through 138 to a source 130. One terminal of each photocell 51 through 58 is grounded. The repective junctions of the photocells 51 through 58 and resistors 131 through 138 are connected to the terminals of a high speed commutator 140.

The commutator 140, illustratively, may be driven at a speed which is four or five times the speed of the prism 19. The commutator 140, accordingly, functions to sample each of the photocells 51 through 58 a number of times during each cyclic rotation of the rotating prism 19. The output of the commutator 140 is provided across a resistor 141 at the input of the A.C. amplifier 61. By sampling the photocells 51 through 58 individually in this manner, a relatively high frequency response is achieved because the A.C. signal, due to the presence of a particle, is superimposed over a D.C. signal developed by only one of the photocells. The photocells may be arranged in groups of four with the signals from each group of opposite polarity and totalized The totalized opposite polarity signals are then introduced to the A.C. amplifier 61 in a manner depicted in FIGURE 4 where the signals from the two photocells 40 and 41 are of opposite polarity and are introduced to the amplifier 61. Such an arrangement, however, where the eight photocells are arranged in two effectively opposite polarity groups is not as sensitive as the system depicted in FIGURE 9 where they are separately sampled.

Figure 10:
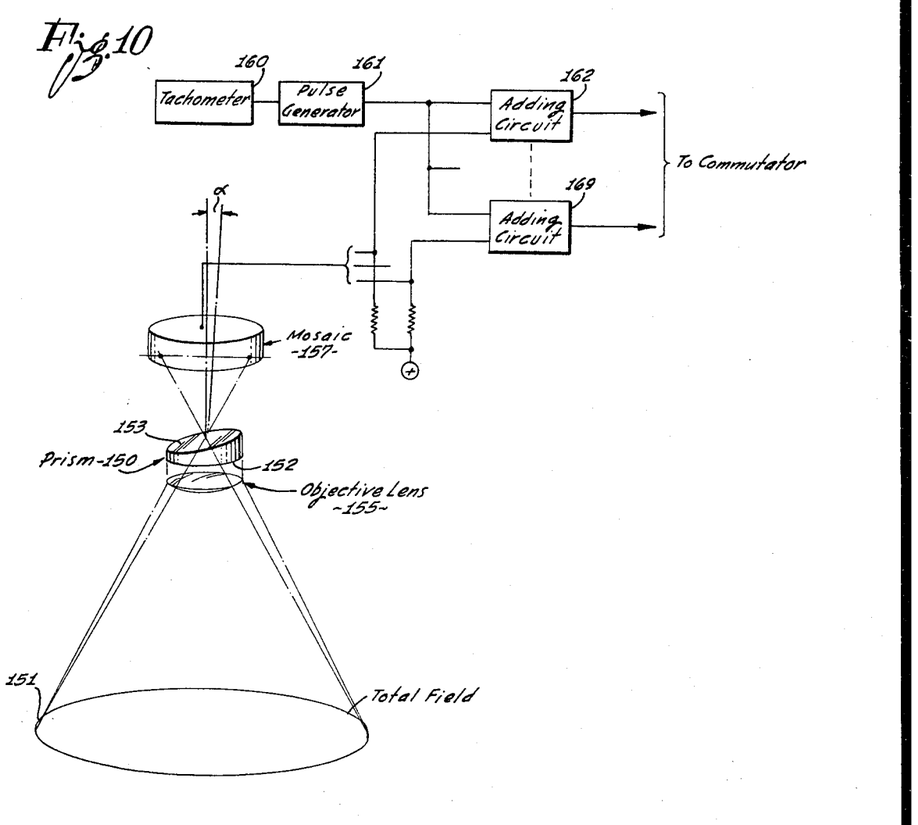
FIGURE 10 is a functional representation of another embodiment of this invention where the scanned area includes substantially the entire field of view.

In the embodiments of the invention described above in reference to FIGURES 1 through 6, a rotating prism 19 couples the light from an area which is considerably smaller than the total viewed field though still considerably larger than the size of the particles to be detected. The embodiment of the invention shown in FIGURE 10 provides for a faster detection of any particles because the entire field is continuously viewed so that a particle is detected instantly. In the embodiment of the invention functionally depicted in FIGURE 10, a rotating prism 150 is provided which scans the total field 151 continuously and which provides for a nutating image of any particle of dirt in the field 151. The prism 150 has a bottom face 152 which is substantially parallel to the bottom of the bottle being inspected and, therefore, is parallel to the plane of the total field 151. The prism 150 also includes a second face 153 which is at an acute angle to its longitudinal axis of rotation. The light from the field 151 is focused through an objective lens 155 which may be rotated together with the prism 150. The objective lens 155 focuses the image of the field 151 on a photocell mosaic 157 which is stationary and positioned adjacent the angled face 153 of the prism 150. The focal length of the objective lens 155 is quite small so that the sensitive surface of the photocell mosaic 157 is positioned relatively close to the prism 150. As the prism 150 rotates, the image of any particle in the field 151 moves across the mosaic 157 to develop an alternating current signal. A particle, for example, in the center of the field 151 would provide for a concentric image across the surface of the mosaic 157 which has a radius determined by the slope of the face 153 of the prism 150. The angle α in FIGURE 10 is equal to one-half of the slope of the face 153. The mosaic 157 may have any number of photocells, two or more, and typically may have eight photocells such as the photocell mosaic 10a described above.

Due to the wobbling motion of the image of the total field 151 at the mosaic 157, an A.C. signal is developed adjacent the periphery of the sensitive surfaces of the mosaic 157. The surface of the mosaic 157 is larger than the image at any instant of the total field 151 thereat so that as the image wobbles it still falls upon the surface 157. At any instant, therefore, a portion of the sensitive surface of the mosaic 157 does not receive any light from the field 151 so that a relatively large signal is developed. In order to cancel this cyclical signal so that only the A.C. components due to the pressure of particles in the field 151 remain, a tachometer generator 160 is utilized to provide a series of pulses having a repetition rate equal to the repetition rate of the pulses produced by the mosaic 157 due to the wobbling motion of the image of the total field 151. If eight photocells are utilized in the mosaic 157, the repetition rate of the pulses produced by each of the photocells is equal to the speed of rotation of the prism 150. The pulses from the tachometer 160 are introduced to a pulse generator 161 which provides pulses which are substantially the same in shape as the pulses developed by each photocell of the mosaic 157 due to the wobbling effect of the field image but 180 degrees out-of-phase thereat. The out-of-phase signals from the pulse generator are introduced to a number of adding circuits 162 through 169, one for each of the photocells of the mosaic 157. The output of each of the adding circuits 162 through 169 is, accordingly, the signal developed by its associated photocell of the mosaic 157 but compensated for the wobbling motion of the field. The signals from the circuits 162 through 169 are, accordingly, D.C. signals in the absence of particles of dirt in the field 151. Any particles in the field 151 provide for a nutating image at the photocell mosaic 157 which crosses a number of the photocells of the mosaic to produce A.C. components. The signals from the adding circuits 162 through 169 may be processed in a manner similar to that described above in reference to FIGURES 9 and 4.

Figure 7:
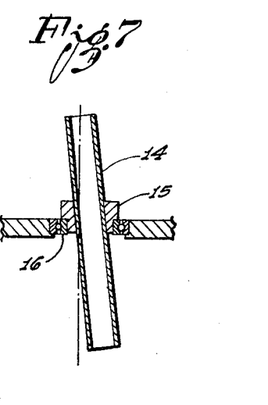
FIGURE 7 is a sectional view through a portion of another embodiment of the optical portion that may be utilized in the inspection apparatus of this invention.

FIGURE 7 illustrates another embodiment of the invention for substitution for the rotating prism 19. The embodiment includes a hollow pipe 14 which has its longitudinal axis offset from its axis of rotation. The pipe 14 has a support 15 mounted in a bearing 16. As the pipe 14 is rotated, it successively scans different areas of the field 32 in a manner quite similar to that of the prism 19. Other suitable equipment for successively scanning different areas of the total field may be utilized such as a casserrainian type of telescope with a tilted mirror optical system.

Although this invention has been disclosed and illustrated with reference to particular applications, the principles involved are, accordingly, susceptible of numerous other applications which will be apparent to persons skilled in the art. The invention is, therefore, to be limited only as indicated by the scope of the appended claims.

What is claimed is:
1. In a system for inspecting a container for particles of foreign matter,
    a source for providing radiant energy to the container to provide an energized field for inspection,
    a radiation sensitive surface for providing electrical signals indicative of the detection of the image of a small particle in the field, said radiation sensitive surface being a composite surface and having at least two independent sensitive areas, a rotating optical member for directing all the radiation received at the member from successive areas of the field to said surface where each area includes the center of the field and the areas together cover the entire field, first circuit means electrically coupled to one-half of said independent areas for developing a pulse of one polarity responsive to a decrease of radiation at any one of said one-half of said independent areas, second circuit means electrically coupled to the second half of said independent areas for developing a pulse of opposite polarity responsive to a decrease of radiation at any one of said second half of said independent areas, an A.C. amplifier coupled to said first and said second circuit means for amplifying alternating currents povided thereto from said first and said second circuit means, and container reject apparatus coupled to said amplifier and operated by said amplifier to reject a container being inspected response to a signal of predetermined magnitude from said amplifier.

2. In a system for inspecting a container for particles of foreign matter in accordance with claim 1, in addition, an inverter coupled to said second circuit means for inverting the polarity of the signals from said second circuit means, an adding circuit coupled to said inverter and to said first circuit means for adding the signals from said inverter to the signals from said first circuit means, and a D.C. amplifier coupled to said adding circuit for removing A.C. components from the signal from said adding circuit and for amplifying the direct current of the signal from said adding circuit to provide a signal indicating the average intensity received at said radiation sensitive surface.

3. In a system for inspecting a container for particles of foreign matter in accordance with claim 1, in addition, third circuit means coupled to said first and to said second circuit means for providing a D.C. signal indicating the average radiation received at said radiation sensistive surface.

4. In a system for inspecting a container for particles of foreign matter, a source for providing radiant energy through the container to form a beam of radiation modulated by any particles in the container, radiation responsive means, a rotating scanning member for cyclically and sequentially coupling different portions of the modulated beam to said responsive means, first circuit means electrically coupled to said responsive means for detecting a signal at said responsive means indicative of the presence of a particle in the container, and second circuit means electrically coupled to said first circuit means for determining the position of the detected particle in the container.

5. A system for inspecting a bottle for small particles of foreign matter, including means for illuminating the bottle to provide a field of light modulated by the opitcal characteristics of the bottle and any particles in the bottle, at least two photocells for converting light impinging thereon to electrical signals, means for sequentially directing the light from different areas of the field of modulated light to said photocells where the area providing light at any instant to the photocells is substantially larger than the size of any particle in the bottle, circuit means including one-half of said photocells for developing signals of a first polarity responsive to the presence of a small particle in the bottle, and circuit means including the other half of said photocells for developing signals of the first polarity responsive to the presence of a small particle in the bottle.

6. A system for inspecting a bottle for small particles of foreign matter, including means disposed relative to the bottle for illuminating the bottle to provide a field of light modulated by the optical characteristics of the bottle and any particles in the bottle, at least two photocells for converting light impinging thereon for electrical signals, means disposed relative to the bottle and the photocells for sequentially directing the light from different areas of the field of modulated light to said photocells where the area providing light at any instant to the photocells is substantially larger than the size of any particle in the bottle, commutator means for sequentially sampling the electrical signals provided by the photocells, and means responsive to the signals sampled by the commutator means for combining the sequentially sampled signals in a particular phase relationship to provide an output indication representing the occurrence of a foreign particle.

7. A system for inspecting a bottle for small particles of foreign matter, including means for illuminating the bottle to provide a field of light modulated by the optical characteristics of the bottle and any particles of foreign matter in the bottle, a bank of photocells for converting light to electrical signals, cyclically movable optical means for directing the light from different areas of the field of light to said bank of photocells, the cross-sectional area of the beam of light from the area at said bank of photocells being substantially the same as the composite sensitive area of the photocells of the bank, the photocells being arranged to together intercept all of the light from said optical means, means for cyclically adjusting said optical means to sequentialy direct the light from different overlapping areas of the field to scan the entire field, whereby the image of a particle in the bottle effectively repeatedly moves across said bank of photocells, means electrically coupled to said bank of photocells for sequentially sampling the electrical signals provided by the different photocells, and bottle reject apparatus responsive to sampled signals from said sampling means having predetermined characteristics for rejecting a bottle being scanned.

8. In a system for inspecting a container for particles of foreign matter, a source disposed relative to the container for directing energy toward the container, scanning means disposed relative to the container for sequentially passing energy from the container only in progressive areas of the container, at least a pair of energy-responsive members disposed relative to the sequential means for producing signals in accordance with the energy sequentially passed from the container, and means operatively coupled to the energy-responsive members and responsive to the signals produced by the energy-responsive members for combining the signals from the pair of energy-responsive members in a particular relationship to provide an output signal having characteristics indicating the position of any foreign particles in the container.

9. In a system for inspecting a container for particles of foreign matter,
- a source disposed relative to the container for directing energy toward the container,
- means disposed relative to the container for providing a sequential scan of progressive areas of the container to obtain a passage of energy from progressive areas of the container,
- at least a pair of energy-responsive members disposed relative to the scanning means to receive the energy passing from the scanning means and to produce pulses representing the occurrence of a foreign particle and having characteristics representing the position of the foreign particle, and
- means operatively coupled to the energy-responsive members and responsive to the pulses produced by the energy-responsive members for combining the pulses from the energy responsive members in a particular relationship to produce an output signal having characteristics indicating the position of the foreign particle.

10. In a system for inspecting a container for particles of foreign matter,
- a source of energy disposed relative to the container for directing energy toward the container,
- cyclically movable scanning means disposed relative to the container for passing only energy from progressive positions of the container at successive instants of time in a cyclic pattern in accordance with the cyclic movements of the movable means,
- at least a pair of energy-responsive members disposed relative to the cyclically movable means,
- means responsive to the energy passing from the cyclically movable means for producing pulses representing the occurrence of a foreign particle and having a pulse length dependent upon the position of the foreign particle in the container, and
- means operatively coupled to the energy-responsive means and responsive to the production of the pulses from the energy-responsive means for combining the pulses in a particular relationship to provide an output pulse representing the position of the foreign particle in accordance with the length of the pulse and the relative time of occurrence of the pulse in each cyclic movement of the movable member.

11. In a system for inspecting a container for particles of foreign matter where the container has a particular diameter,
- a source disposed relative to the container for directing energy toward the container,
- nutating means disposed relative to the container for passing energy from the container at progressive areas of the container and at successive instants of time where each progressive area has a diameter length greater than one-half of the container diameter to provide an overlap in the progressive areas,
- at least a pair of members responsive to the energy passing from the nutating means to the members to produce signals having characteristics in accordance with the characteristics of such energy, and
- means responsive to the signals produced by the pair of members for combining the signals in a particular relationship to provide an output indication representing the occurrence of a foreign particle regardless of the position of the foreign particle.

12. The system set forth in claim 11 in which further means are responsive to the signals produced by the pair of members for providing an output indication representing the position of the foreign particle.

13. In a system for inspecting a container for particles of foreign matter,
- a source disposed relative to the container for providing energy to the container to provide an energized field for inspection,
- a prism disposed relative to the container and rotatable to pass at successive instants of time energy from the field,
- at least a pair of sensitive surfaces positioned relative to the rotating prism and relative to each other to receive energy passed by the rotating prism at progressive areas of the field and to produce signals in accordance with such received energy, and
- means responsive to the signals produced by the pair of sensitive surfaces for combining such signals in a particular relationship to produce signals representing the occurrence of a particle of foreign matter in the container.

14. The system set forth in claim 13 in which the combining means are responsive to the signals produced by the pair of sensitive surfaces for combining such signals in a particular phase relationship to produce signals representing the occurrence of a particle of foreign matter.

15. In a system for inspecting a bottle for particles of foreign matter where the bottle has a center and a periphery,
- means disposed relative to the bottle for illuminating the bottle to provide a field of light modulated by the optical characteristics of the bottle and any particles in the bottle,
- at least two photocells disposed in spaced relationship to each other and to the illuminating means,
- means disposed relative to the photocells and to the illuminating means for sequentially directing the light from different areas of the field of modulated light to said photocells where the area providing light at any instant to the photocells includes the center and a portion of the periphery of the bottle, and
- means responsive to the signals from the photocells for combining the signals to provide an output signal indicating a foreign particle in the system in accordance with changes in the characteristics of the output signal.

16. The system set forth in claim 15 in which the combining means are responsive to the signals from the photocells for combining the signals in a particular phase relationship to provide an output signal indicating a foreign particle in the system in accordance with changes in the characteristics of the output signal.

17. In a system for inspecting a bottle for particles of foreign matter,
- means disposed relative to the bottle for illuminating the bottle to provide a field of light modulated by the optical characteristics of the bottle and any particles of foreign matter in the bottle,
- at least a pair of photocells,
- cyclically movable optical means disposed relative to the illuminating means and the pair of photocells for directing the light from different areas of the field of light to said pair of photocells,
- means operatively coupled to the optical means for cyclically moving said optical means to sequentially direct the light from the different areas of the field to the pair of photocells whereby the image of a particle in the bottle effectively moves cyclically across said pair of photocells, and
- means responsive to the signals from the photocells for combining the signals in a particular phase relationship to obtain an output pulse upon the occurrence of a foreign particle in the bottle.

18. A system for inspecting a bottle for particles of foreign matter in accordance with claim 17, wherein said optical means includes a rotating prism having a first face adjacent the bottle and at an acute angle to the axis of rotation of the prism, and a second face adjacent the pair of photocells and transverse to the axis of rotation of the prism.

19. In a system for inspecting a container for particles of foreign matter, a source disposed relative to the container for providing energy to the container to provide an energized field for inspection, an energy-sensitive surface for providing electrical signals indicative of the detection of the image of a small particle in the field, and a rotating optical member disposed relative to the container and the energy-sensitive surface for directing the radiation received at the member from successive areas of the field to said surface, said energy-sensitive surface being a composite surface having at least two independent areas, first circuit means electrically coupled to a first one of said two independent areas for developing a first pulse of a first polarity responsive to a decrease of energy at said first independent areas, second circuit means electrically coupled to the second independent areas for developing a second pulse of the first polarity responsive to a decrease of radiation at said second independent area, and third circuit means responsive to the pulses from said first and said second circuit means for developing an output pulse representing the occurrence of a foreign particle.

20. In a system for inspecting a container for small particles of foreign matter, a source disposed relative to the container for providing energy to the container to provide an energized field for inspection, a rotating prism disposed relative to the container for continuously receiving energy from the entire energized field of the container and for directing the received energy along a circular nutation path, at least a pair of stationary energy-sensitive surfaces positioned relative to each other for receiving the energy directed by said rotating prism throughout its rotating cycle and for producing signals in accordance with the energy received, and means responsive to the signals produced by the energy-sensitive means for combining the signals in a particular phase relationship to provide output signals representing the occurrence of a particle of foreign matter in the container.

21. In combination for sensing the presence of foreign particles in a container having a bottom wall, first means disposed relative to the container for directing energy toward the container, at least a pair of sensing means disposed relative to the container for sensing the energy passing from the container, rotatable means disposed relative to the container and the first and second means for passing to the sensing means the energy from progressive segments of the container where each segment includes the center of the container and a portion of the periphery of the container and where the progressive segments fully scan the bottom of the container and result from the rotation of the rotatable means, means operatively coupled to the rotatable means for obtaining a rotation of such rotatable means, and means responsive to the signals produced in the sensing means during the revolutions of the rotatable means for combining such signals in a particular relationship to produce an output signal representing the occurrence or lack of occurrence of a foreign particle in the container.

22. In combination for sensing the presence of foreign particles in a container having a bottom wall, a source of energy disposed relative to the container for introducing energy to the container to provide an energized field for inspection, at least a pair of energy-sensing means disposed in spaced relationship to each other and disposed relative to the container to receive energy from the container and constructed to produce signals in accordance with the received energy, means including a prism disposed relative to the container and rotatable to provide for the passage from the container to the sensing means of energy in progressive segments where each segment includes the center of the bottom wall of the container and a portion of the periphery defining the bottom wall of the container, and electrical circuitry responsive to the signals from the pair of sensing means for combining these signals to produce an output signal representing the occurrence or lack of occurrence of a foreign particle in the container.

23. The combination set forth in claim 22 in which the source of energy and the first and second sensing means are stationary.

24. In a system for inspecting a container for small particles of foreign matter, a source for providing radiant energy to the container to provide an energized field for inspection, a rotatable prism for continuously receiving radiation from the energized field and for directing the received radiation along a circular nutation path, means operatively coupled to the prism for obtaining a rotation of the prism, a plurality of stationary radiation-sensitive surfaces positioned relative to one another for continuously receiving the radiation directed by said rotating prism from different portions of the energized field throughout the cycle of rotation of the prism to obtain the continuous production of signals by the radiation-sensitive surfaces in accordance with the energy received, and compensating means synchronized with said rotating prism and electrically coupled to said radiation-sensitive surfaces for compensating any signals provided by said surfaces responsive to the wobbling motion of the image of the field at said surfaces.

25. In a system for inspecting a container for small particles of foreign matter in accordance with claim 24, wherein said compensating means includes means synchronized with said rotating prism for developing a predetermined compensating signal and a combining circuit for each of said surfaces for combining the compensating signal with the signal from said surface.

26. In a system for inspecting for dirt a bottle having a bottle inspection zone defined by a means for illuminating a bottle at one side of said zone to provide a light field emanating from said bottle, photoelectric means for inspecting said bottle positioned at the other side of said zone, and means for passing a bottle through said inspection zone, the system being independent of any motion of the bottle relative to the system, the improvement wherein said photoelectric means consists of at least two photocells disposed within the bottle inspection zone and having sensitive surfaces in the sensitive zone areas of the light field where each of the areas is smaller than the light field, scanning means movable in a particular path to successively direct light from the successive ones of the number of areas of the light field to said photocell means until the entire light field has been scanned by said photocell means, and means operatively coupled to the photocells and tuned to a particular alternating frequency to produce signals at the particular alternating frequency upon the occurrence of a foreign particle in the bottle and independent of any motion of the bottle relative to the system.

27. In a system for inspecting a container for particles of foreign matter where the system is independent of any motion of the container relative to the system, a source disposed relative to the container for directing energy to the container to provide an energized field for inspection, optical means disposed relative to the container and rotatable to pass at successive instants of time energy from different portions of the energized field, at least a pair of sensitive surfaces positioned relative to the rotatable optical means and relative to each other to receive energy passed by the rotatable optical means from the different portions of the energized field by the pair of sensitive surfaces and to produce signals having characteristics in accordance with such received energy and independent of any motion of the container, and means responsive to the signals produced by the pair of sensitive surfaces for operating upon such signals to produce output signals representing the occurrence of a particle of foreign matter in the container.

28. In a system for inspecting a container for particles of foreign matter, means disposed relative to the container for illuminating the container to provide a field of light modulated by the optical characteristics of the container and any particle in the container, at least two light sensitive members disposed in spaced relationship to each other and to the illuminating means, means disposed relative to the light sensitive members and to the illuminating means for sequentially directing the light from progressive areas of the field of modulated light to the light sensitive members where the area providing light at any instant to the light sensitive members includes the center and a portion of the periphery of the container, and electrical circuitry means responsive to the signals from the light sensitive members for operating upon such signals to provide an output signal indicating a foreign particle in the container in accordance with changes in the characteristics of the output signal.

29. In a system for inspecting a container for particles of foreign matter, means disposed relative to the container for illuminating the container to provide an optical field of light modulated by the optical characteristics of the container and by any particles of foreign matter in the container, at least a pair of light sensitive members to receive light from the field, cyclically movable optical means disposed relative to the illuminating means and the pair of light sensitive members for directing the light from progressive areas of the field of light to the pair of light sensitive members in accordance with the cyclical movement of the optical field, and means operatively coupled to the optical means for cyclically moving the optical means to obtain a repetitive direction of the progressive areas of the field to the pair of light sensitive members and to obtain the production of signals by the sight sensitive members in accordance with the direction of the progressive areas of the field to the light sensitive members.

30. In the system set forth in claim 29, electrical means responsive to the signals from the light sensitive members for operating upon such signals to obtain an output pulse upon the occurrence of a foreign particle in the container.

31. In apparatus for inspecting bottles for cleanliness wherein there is positioned a source of illumination opposite the bottom of a bottle to be inspected to provide an illuminated field, and means for detecting a change in the illumination of an illuminated image positioned opposite the top of said bottle, the improvement in said means for detecting comprising a rotatable prism disposed to pass the light in the illuminated field, a plurality of photocells individually arranged to receive the light passed by the prism in the illuminated field and to obtain an inspection at least once by one or more of said photocells of every radial increment of the field at least once by one or more of the photocells during one complete revolution of the prism, means for rotatably supporting said prism between the top of said bottle and said plurality of photocells to obtain a continuous reception by said prism of light in the illuminated field, means for rotating said rotatably supported prism, and means for continuously focusing the light passing through said prism upon said plurality of photocells to be scanned thereby to obtain a continuous energizing of each of the photocells in the plurality.

32. In apparatus for inspecting bottles for cleanliness, a source of illumination opposite one end of a bottle to be inspected to provide an illuminated field thereof, a prism, means for rotatably supporting said prism opposite the opposite end of said bottle, means for rotating the prism, a plurality of photocells arranged in a pattern to obtain an inspection at least once by one or more of the photocells of every radial increment of the field during one complete rotation of said prism, means disposed relative to said prism and said plurality of photocells for continuously focusing the light from said prism upon said plurality of photocells to provide a continuous output from each of said photocells in said plurality and to afford scanning of said illuminated field by said photocells, and means responsive to the output from the plurality of photocells in the presence of foreign matter in said bottle to provide an indication thereof.

33. In a system for inspecting a container for small particles of foreign matter, a source disposed relative to the container for providing energy to the container to provide an energized field for inspection, a rotatable prism disposed relative to the container for continuously receiving energy from the energized field of the container, means operatively coupled to the prism for obtaining a rotation of the prism, and at least a pair of independent stationary energy-sensitive surfaces each positioned relative to the rotatable prism for continuously receiving energy from the rotatable prism in discrete portions of the energized field in accordance with the rotation of the prism to scan the energized field and for producing signals at each instant in accordance with the energy received by that energy-sensitive surface.

34. In the system set forth in claim 33, means disposed relative to the container, the prism and the energy-sensitive surfaces for continuously focusing on each of the energy-sensitive surfaces the light passing through the prism from the container.

35. In a system for inspecting a container for foreign matter independently of any motion of the container, an energy source directed at the container to provide an energized field for inspection, energy-sensitive means consisting of at least two independent stationary energy-sensitive surfaces positioned to receive energy from progressive portions of the energized field to produce signals in accordance with such received energy, optical means rotatable with respect to the container and the energy-sensitive means to produce a relative motion between the progressive portions of the energized field and the energy-sensitive means and to continuously direct energy to each of the energy-sensitive surfaces from the progressive portions of the energized field for the continuous production of signals by each of the energy-sensitive surfaces, means coupled to the optical means for supporting said optical means, and means coupled to the optical means for obtaining a rotation of the optical means.

36. In a system for inspecting a container for foreign matter independently of any motion of the container, an energy source directed at the container to provide an energized field for inspection, energy-sensitive means consisting of at least two stationary energy-sensitive surfaces each constructed to receive at each instant energy from the field and produce a signal at each instant in accordance with the energy received at that instant, the energy-sensitive means being positioned to provide at successive instants for an intersection of energy from progressive portions of the energized field by a combination of said energy-sensitive surfaces, optical means rotatable with respect to the container and the energy-sensitive means to produce a relative motion between the progressive portions of the energized field and the energy-sensitive means and to direct at each instant energy from the progressive portions of the energized field to the energy-sensitive surfaces for the continuous production of signals by the energy-sensitive surfaces, means coupled to the optical means for supporting said optical means, and means coupled to the optical means for rotating the optical means.

References Cited by the Examiner

UNITED STATES PATENTS

| | | | |
|---|---|---|---|
| 2,137,187 | 11/1938 | Stoate | 209—111.7 X |
| 2,265,037 | 12/1941 | Gulliksen | 88—14 |
| 2,649,500 | 8/1953 | Fedorchak. | |
| 2,946,893 | 7/1960 | Baum | 250—203 |

M. HENSON WOOD, JR., *Primary Examiner.*

ROBERT B. REEVES, R. A. SCHACHER, *Examiners.*